(12) United States Patent
McDonald et al.

(10) Patent No.: US 6,920,114 B2
(45) Date of Patent: Jul. 19, 2005

(54) METHOD OF CALL CONTROL FOR CONSOLE SITES MONITORING CRITICAL TALKGROUPS IN A PACKET-BASED COMMUNICATION SYSTEM

(75) Inventors: Daniel J. McDonald, Cary, IL (US); John W. Maher, Woodstock, IL (US); Brian R. Poe, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 880 days.

(21) Appl. No.: 09/728,619

(22) Filed: Dec. 1, 2000

(65) Prior Publication Data

US 2002/0097746 A1 Jul. 25, 2002

(51) Int. Cl.[7] .......................... H04L 12/16; H04J 3/16; H04B 7/00
(52) U.S. Cl. ................. 370/260; 370/465; 455/512; 455/518
(58) Field of Search ............................. 370/260, 263, 370/380, 329, 465, 468, 261; 455/508, 512, 518

(56) References Cited

U.S. PATENT DOCUMENTS

| | | | | |
|---|---|---|---|---|
| 5,570,411 A | * | 10/1996 | Sicher | 455/450 |
| 5,583,869 A | * | 12/1996 | Grube et al. | 370/347 |
| 5,790,956 A | * | 8/1998 | Lo et al. | 455/512 |
| 5,901,363 A | * | 5/1999 | Toyryla | 455/527 |
| 5,914,958 A | * | 6/1999 | Chinitz et al. | 370/441 |
| 6,564,066 B1 | * | 5/2003 | Biggs et al. | 455/512 |
| 6,647,020 B1 | * | 11/2003 | Maher et al. | 370/432 |

* cited by examiner

Primary Examiner—Andy Lee
(74) Attorney, Agent, or Firm—Steven R. Santema; Terri S. Hughes; Indira Saladi (57) ABSTRACT

A method of call control in a packet-based communication system having consoles, distributed among one or more console sites, that are adapted to monitor talkgroup calls. The console sites are served by console site links having a limited available bandwidth. Upon receiving a request for a talkgroup call, there is identified a number of priority consoles requesting participation in a talkgroup call. For example, the priority consoles (or console operators) may indicate that monitoring of the talkgroup call is "critical" for those consoles. Based on the location of the priority consoles, a number of priority console sites are identified for the talkgroup call. If sufficient bandwidth (e.g., call units of bandwidth) is available (or made available) to each of the priority console sites, the call is granted. Alternatively or additionally, the call may be granted to certain non-priority console sites if bandwidth is available. Bandwidth may be made available for critical talkgroups at certain sites by pre-empting non-critical talkgroups being monitored at those sites.

20 Claims, 3 Drawing Sheets

METHOD OF CALL CONTROL FOR CONSOLE SITES MONITORING CRITICAL TALKGROUPS IN A PACKET-BASED COMMUNICATION SYSTEM

FIELD OF THE INVENTION

This invention relates generally to communication systems and, more particularly, to packet-based communication systems.

BACKGROUND OF THE INVENTION

Communication systems typically include a plurality of communication units, such as mobile or portable radio units and dispatch consoles that are geographically distributed among various repeater sites and console sites. The communication units wirelessly communicate with the repeater sites and each other, and are often logically divided into various subgroups or talkgroups. Communication systems may be organized as trunked systems, where a plurality of communication resources is allocated amongst multiple users or groups by assigning the repeaters within a radio frequency (RF) coverage area on a call-by-call basis, or as conventional (non-trunked) radio systems where communication resources are dedicated to one or more users or groups. In trunked systems, or in mixed trunked and conventional systems, there is usually provided a central controller (sometimes called a "zone controller") for allocating communication resources among multiple sites. The central controller may reside within a single device or multiple devices and may be located at a fixed equipment site or may be distributed among the repeater or console sites.

Traditionally, the repeater and console sites were linked via a circuit-switched architecture, through dedicated or on-demand circuits to a central radio system switching point ("central switch"). More recently, communication systems are using packet-switched networks where information that is to be communicated between endpoints is divided into packets and transported by various routers forming an Internet Protocol (IP) network. For example, communication systems using packet-switched networks are described and claimed in U.S. Pat. No. 6,141,347, titled "Wireless Communication System incorporating Multicast Addressing and Method for Use" and U.S. Pat. No. 6,647,020, titled "Methods for Implementing Talkgroup Call in a Multicast IP Network," each of which is assigned to the assignee of the present invention and incorporated herein by reference in its entirety.

Packet-switched networks are sometimes called "connectionless" networks because they do not provide dedicated bandwidth or circuits between endpoints, but rather permit communications between multiple endpoints to proceed concurrently over shared paths or connections. For practical reasons, certain of the shared links may be sized to accommodate fewer endpoints than may desire to participate in a call. As an example, console sites in Motorola's SMART-ZONE™ communication systems may include up to 30 operator positions having "select" and "unselect" speakers for monitoring up to 64 talkgroups, either passively (i.e., low volume in the "unselect" speaker) or actively (i.e., with "select" audio or high volume "unselect" audio). However, the console site links are typically configured with no greater than a T-1 or E-1 link. If all the talkgroups become active, the bandwidth required to monitor all of the talkgroups far exceeds the available bandwidth and typically, the excess calls will be "busied," or denied use of the link until bandwidth becomes available. Moreover, it is possible that the available bandwidth is consumed by relatively low priority calls (e.g., passively monitored talkgroups), causing relatively high priority calls (e.g., actively monitored "critical" talkgroups) to be busied.

Accordingly, to the extent shared links of a packet-based communication system have limited available bandwidth, it would be desirable for a method of call control that allocates priority level(s) to requested calls, such that the limited bandwidth of the shared link(s) is allocated to higher priority calls before lower priority calls. Particularly in a packet based communication system having console site link(s) with limited available bandwidth, it would be desirable to dynamically associate a high priority level to certain console calls (e.g., critical talkgroups), such that the limited bandwidth of the console site link(s) is allocated on a priority basis for the high priority calls. The present invention is directed to satisfying these needs.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

In one embodiment of the present invention, there is provided a method of call control in a communication system using a packet network for distributing packets between endpoints desiring to participate in talkgroup calls, wherein the endpoints include a plurality of consoles distributed among one or more console sites. Upon receiving a request for a talkgroup call, there is identified a number of priority consoles requesting participation in a talkgroup call. The identification of consoles as priority consoles may be accomplished by a call controller ("zone controller") upon receiving a message from one or more consoles requesting priority participation in the talkgroup call, for example, indicating that monitoring of the talkgroup call is "critical" for those consoles. Alternatively, a management device (such as Motorola's SmartZone Network Manager) may preprovision the zone controller with the critical talkgroups per console. Based on the location of the priority consoles, a number of priority console sites are identified for the talkgroup call. If sufficient bandwidth (e.g., call units of bandwidth) is available for each of the console site links, the call is granted. Otherwise, the call may be busied until sufficient bandwidth becomes available on the priority console site links to support the call. Optionally, the call may be granted pre-empting other calls (e.g., "non-critical" talkgroup calls) as needed until sufficient bandwidth becomes available on the priority console site links to support the call.

In another embodiment of the present invention, there is provided a method of call control in a communication system including a plurality of consoles distributed among one or more console sites substantially as described above, wherein upon receiving a call request for a talkgroup call, there is identified a number of priority consoles and a number of non-priority consoles requesting participation in the talkgroup call. The identification of consoles as priority consoles may be accomplished by a call controller ("zone controller") upon receiving a message from one or more consoles requesting priority participation in the talkgroup call, for example, indicating that monitoring of the talkgroup call is "critical" for those consoles. Conversely, the identification of consoles as non-priority consoles may be accomplished by the zone controller based on indicia that monitoring the talkgroup is not critical for certain consoles (e.g., the absence of a message indicating that the talkgroup is critical). Console sites including one or more priority consoles are identified as priority console sites and console sites including only non-priority consoles are identified as non-priority console sites for the talkgroup call.

If sufficient bandwidth (e.g., call units of bandwidth) is available (or made available) to each of the priority console sites, the call is granted. Bandwidth may be made available for critical talkgroups being monitored at priority console sites by preempting non-critical talkgroups being monitored at those sites. Non-priority console sites may also be granted into the call if sufficient bandwidth is available.

Optionally, if sufficient bandwidth is not available to a non-priority console site, the zone controller may notify console(s) at the non-priority console site that they are not receiving payload (e.g., audio, video or data) associated with the talkgroup call, thereby giving the console(s) (or console operators) an opportunity to promote the monitoring status of those console(s). Based on requested changes in monitoring status, the zone controller may designate new priority consoles and/or new priority console sites. If sufficient bandwidth (e.g., call units of bandwidth) is available to the new priority console sites (or made available by pre-empting other calls), the call is granted into those sites. As another option, consoles otherwise designated as non-priority consoles for a particular talkgroup may be changed to priority consoles, for at least the duration of the talkgroup call, if they activate a PTT switch indicating a desire to source payload for the talkgroup call.

Figure 1:
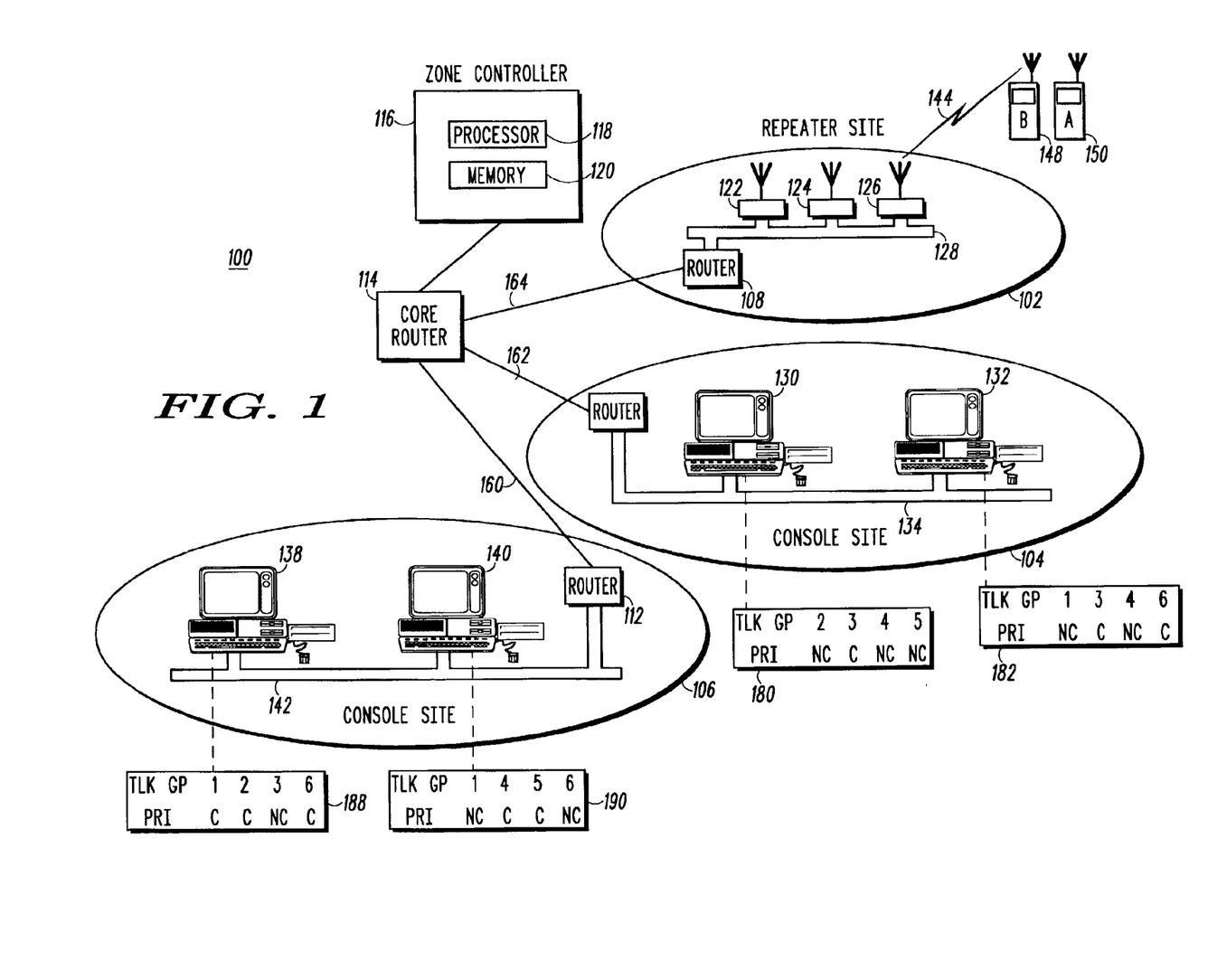
FIG. 1 is a block diagram of a packet-based communication system according to the invention.

Turning now to the drawings and referring initially to FIG. 1, there is shown a single-zone packet-based communication system 100 comprising a plurality of sites 102, 104, 106 that are logically coupled, via respective router elements 108, 110, 112 to a core router element 114. The router elements 108–114 maybe embodied in separate physical devices, for example, 3Com "NetBuilder" series routers, or combinations of such devices. For convenience, the router elements will hereinafter be referred to as "routers." The core router 114 is coupled to a zone controller 116 having a processor 118 (such as a microprocessor, microcontroller, digital signal processor or combination of such devices) and a memory 120 (such as volatile or non-volatile digital storage devices or combination of such devices). The zone controller 116 may be linked, through the packet network, to zone controllers of other communication zones (not shown in FIG. 1).

As shown, site 102 of the communication system is a repeater site, having a plurality of repeaters 122, 124, 126 that communicate, via wireless communication resources 144 with communication units 148, 150 within its radio frequency (RF) coverage area. The repeaters 122, 124, 126 are coupled, via Ethernet 128 to an associated router 108. Suitable wireless communication resources 144, 146 are multiple RF (radio frequency) channels such as pairs of frequency carriers, time division multiple access (TDMA) slots, code division multiple access (CDMA) channels, or any other RF transmission media. The communication units 148, 150 (sometimes called "subscriber units") may comprise mobile or portable wireless radio units and may be arranged into talk groups having corresponding talk group identifications as known in the art. Any number of talk groups having corresponding talk group identifications can be established within the system 100.

Sites 104 and 106 are consoles sites, each having a plurality of monitoring console positions. Site 104 includes consoles 130, 132 coupled via Ethernet 134 to router 110, and site 106 includes consoles 138, 140 coupled via Ethernet 142 to router 112. Consoles 130, 132, 138, 140 may comprise wireless or wireline consoles. Console positions 130, 132, 138, 140 can affiliate with various talkgroups for monitoring purposes, that is to receive payload (e.g., audio, video, data) being communicated on the talkgroups, or to source payload for the talkgroups. According to one embodiment of the present invention, the consoles may also indicate a monitoring priority of the talkgroups, for example, as having a "critical" or "non-critical" monitoring priority. For convenience, an example set of talkgroups that are being monitored by consoles 130, 132, 138, 140, and the monitoring priorities associated with those talkgroups are shown in boxes 180, 182, 188, 190. In one embodiment, the zone controller allocates communication resources, e.g., call units of bandwidth on the console site links 160, 162, based on information of the type shown in boxes 180, 182, 188, 190, as will be described in greater detail in relation to FIG. 2 and FIG. 3.

Practitioners skilled in the art will appreciate that the repeater site 102 may include console positions, the console sites 104, 106 may include repeaters, and the network 100 may include various other communication devices not shown in FIG. 1. For example, the network 100 may include wireline communication device(s), site controller(s), comparator(s), telephone interconnect device(s), internet protocol telephony device(s), call logger(s), scanner(s) and gateway(s). Generally, such communication devices may be either sources or recipients of payload and/or control messages routed through the network 100.

In one embodiment, the repeaters 122, 124, 126 and router 108 at site 102, the consoles 130, 132 and router 110 at site 104, and the consoles 138, 140 and router 112 at site 106, the core router 114 and zone controller 116, as well as any corresponding devices in different communication zones (not shown) are all IP host devices that are able to send and receive IP datagrams between other host devices of the network. Each host device has a unique IP address. The host devices include respective processors (which may comprise, for example, microprocessors, microcontrollers, digital signal processors or combination of such devices) and memory (which may comprise, for example, volatile or non-volatile digital storage devices or combination of such devices). The routers 108–114 are specialized or general purpose computing devices configured to receive IP packets or datagrams from a particular host in the communication system 100 and relay the packets to another router or another host in the communication system 100.

In accordance with internet protocol, the IP packets may be designated for unicast or multicast communication. Unicast is communication between a single sender and a single receiver over the network. Multicast is communication between a single sender and multiple receivers on a network. Each type of data communication is controlled and indicated by the addressing information included in the packets of data transmitted in the communication system 100. For a unicast message, the address of the packet indicates a single receiver. For a multicast communication, the address of the packet indicates a multicast group address to which multiple hosts may join to receive the multicast communication. In such case, the routers of the network replicate the packets, as necessary, and route the packets to the designated hosts via the multicast group address.

Typically, certain links of the communication system 100, for example the console site links 160, 162 have a limited bandwidth that may not accommodate all of the endpoints desiring to participate in calls at any particular time. patent application Ser. No. 09/728,621, titled "Method for Managing Bandwidth in a Packet Based Communication System," assigned to the assignee of the present invention and incorporated herein by reference in its entirety, has described and claimed a method of call control using call counts, or call units of bandwidth between different endpoints of the communication system, managed by zone controller(s). Call counts may be allocated for different possible paths between endpoints and then, call requests are granted, denied or busied, as appropriate based on the availability of the call units of bandwidth. The use of call counts ensures that the zone controller will not over-subscribe the links, or grant more calls than the network will support. However, as has been noted, it is possible that the available bandwidth (call counts) may be consumed by relatively low priority calls (e.g., passively monitored talkgroups), causing relatively high priority calls (e.g., actively monitored "critical" talkgroups) to be busied. The present invention provides methods for identifying consoles and/or talkgroups as critical so that calls for critical talkgroups/consoles may be established on a priority basis over less critical calls.

Figure 2:
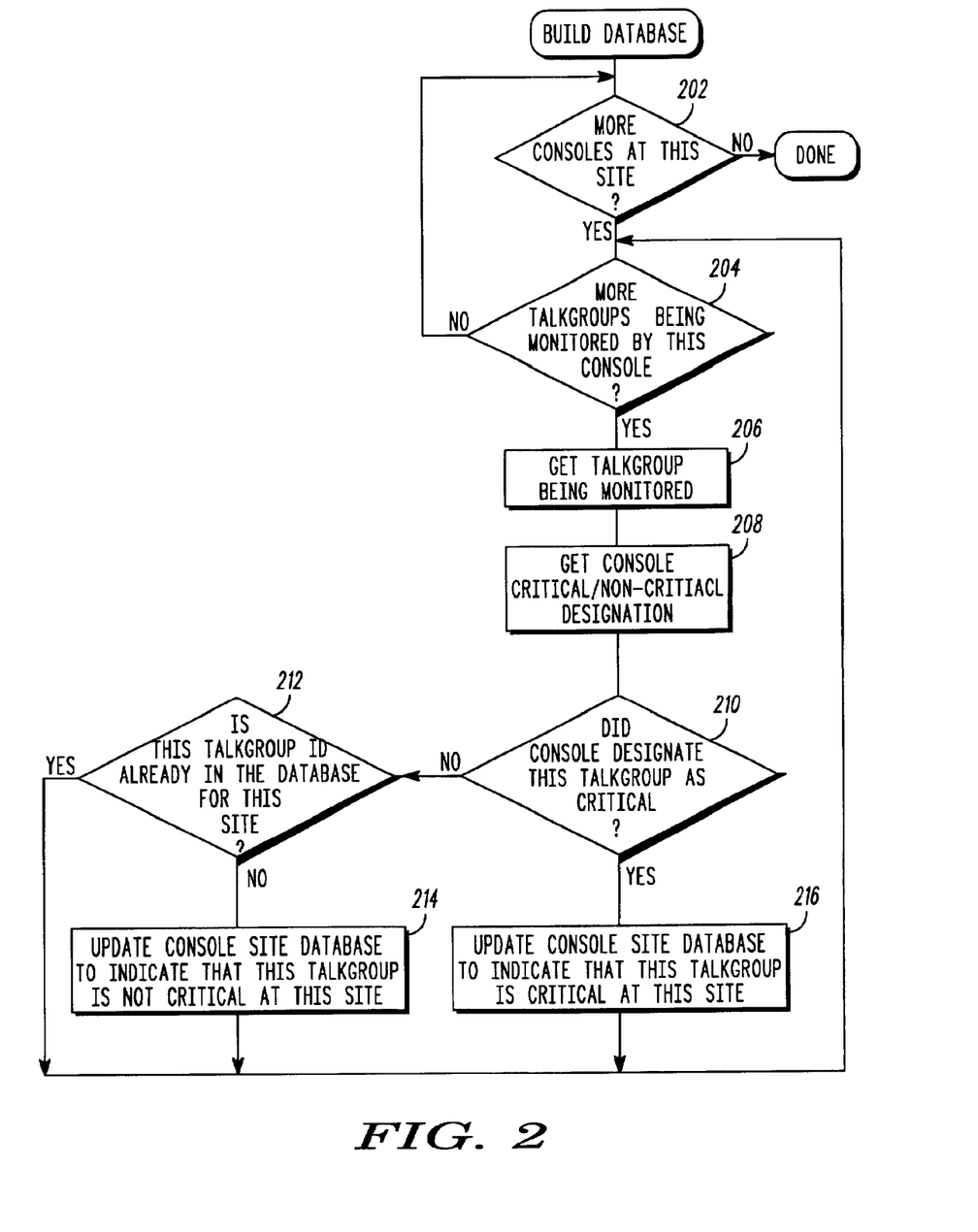
FIG. 2 is a flowchart showing a method of building a database of critical talkgroups being monitored at console sites of a packet-based communication system.

FIG. 2 shows a method of building a database identifying critical talkgroups/consoles at various sites according to one embodiment of the invention. The steps of FIG. 2 are implemented, where applicable, using stored software routines within the zone controller and/or consoles at the various sites. For convenience, the steps of FIG. 2 will be described with reference to the zone controller 116 and consoles 130, 132, 138, 140 of FIG. 1. The zone controller either knows or learns which talkgroups are desired to be monitored by each console and which ones of the talkgroups are requested for priority participation (e.g., "critical" talkgroups), by obtaining information of the type shown in boxes 180, 182, 188, 190 from the consoles 130, 132, 138, 140 or from a management device. The information may be communicated to the zone controller in status message(s), for example, at the time of the consoles affiliating with the various talkgroups, or upon a change in status. Alternatively, the information may be provided to the zone controller from devices other than the consoles such as, for example, a management device.

At each site, the zone controller determines at step 202, if there are any (or any more) consoles at the site from which information is to be obtained. If so, the process proceeds to step 204 to obtain information regarding one of the remaining consoles. Otherwise, if there are no remaining consoles, the process is complete (at that site). For example, assume that the zone controller 116 first considers the consoles at site 104. Upon the first occurrence of step 202, there are two consoles 130, 132 from which information is to be obtained. Thus, the process proceeds to step 204 to obtain talkgroup information regarding one of the consoles. Assume for purposes of the present example that talkgroup information is first obtained from console 130.

At step 204, the zone controller determines if there are any (or any more) talkgroups being monitored by console 130 from which information is to be obtained. If so, the process proceeds to step 206 to obtain a talkgroup identification (ID) of one of the talkgroups being monitored. Otherwise, if there are no more talkgroups being monitored by the console, the process returns to step 202 to check other consoles at the site. In the present example, upon the first occurrence of step 204, there are four talkgroups (e.g., 2, 3, 4, 5) being monitored by console 130 from which information is to be obtained. Thus, the process proceeds to step 206 to begin obtain a talkgroup ID of one of the talkgroups being monitored. Assume for purposes of the present example that the zone controller obtains the talkgroup ID of the first talkgroup (e.g., talkgroup 2) being monitored by console 130. Then, at step 208, the zone controller gets the critical or non-critical designation of talkgroup 2 for console 130. Referring to box 180, FIG. 1, console 130 has designated talkgroup 2 as "NC," or non-critical.

For any talkgroups designated as critical at a particular site, step 210, the zone controller updates its console site database at step 216 to indicate that the talkgroup is critical at that site. Otherwise, for talkgroups not designated as critical (e.g., designated as non-critical), unless the talkgroup ID is already in the console site database, step 212, the zone controller updates its console site database at step 214 to indicate that the talkgroup is not critical at that site. Thus, in the present example, the zone controller will update its console site database to indicate that at site 104, talkgroup 2 is non-critical.

The flowchart of FIG. 2 is repeated until the zone controller completes a database of talkgroup IDs and monitoring status associated with all of the consoles at the various sites. The zone controller will then designate a site monitoring status associated with each talkgroup being monitored at the site. Table 1, below, represents an example database of talkgroup IDs, console monitoring status and site monitoring status compiled from the information in boxes 180, 182, 188, 190 of FIG. 1.

TABLE 1

| SITE 104 | | |
|---|---|---|
| Console 130 | Console 132 | Site Monitoring Status |
| 1/- | 1/NC | 1/NC |
| 2/NC | 2/- | 2/NC |
| 3/C | 3/C | 3/C |
| 4/NC | 4/NC | 4/NC |
| 5/NC | 5/- | 5/NC |
| 6/- | 6/C | 6/C |

| SITE 106 | | |
|---|---|---|
| Console 138 | Console 140 | Site Monitoring Status |
| 1/C | 1/NC | 1/C |
| 2/C | 2/- | 2/C |
| 3/NC | 3/- | 3/NC |
| 4/- | 4/C | 4/C |
| 5/- | 5/C | 5/C |
| 6/C | 6/NC | 6/C |

In one embodiment, as may be observed from Table 1, the zone controller designates a talkgroup as critical for a particular site if any of the consoles at that site have identified the talkgroup as critical. In particular, at site 104, talkgroups 3 and 6 are designated as critical because consoles 130, 132 have designated talkgroup 3 as critical, and console 132 has designated talkgroup 6 as critical (talkgroup 6 is not being monitored by console 130, as indicated by the notation 6/--). At site 106, talkgroups 1, 2 and 6 are critical because console 138 has designated them as critical, and talkgroups 4 and 5 are critical because console 140 has designated them as critical. In one embodiment, the zone controller will designate a talkgroup as non-critical for a particular site if none of the consoles have identified the talkgroup as critical. For example, at site 104, talkgroups 1, 2, 4 and 5 are non-critical because neither of consoles 130, 132 have designated them as critical. At site 106, talkgroup 3 is non-critical because neither of consoles 138, 140 have designated it as critical.

As will be appreciated, a variety of alternative methods may be used to designate a call as a priority or non-priority call. For example, in one embodiment, the zone controller may determine a volume threshold for priority calls, and designate a call as a non-priority call if it is being monitored at a volume less than the volume threshold. Thus, calls that are being monitored at high volume may automatically be considered high priority (or "critical") calls, whereas calls that are being monitored at low volume will be low priority (or "non-critical") calls. As another example, a call may be designated as a non-priority call if it is in hang-time, even if it was formerly a priority call. As still another example, a call may be designated as a priority call automatically, for at least the duration of the call, if a console has pressed a PTT switch indicating a desire to source payload for the call.

Figure 3:
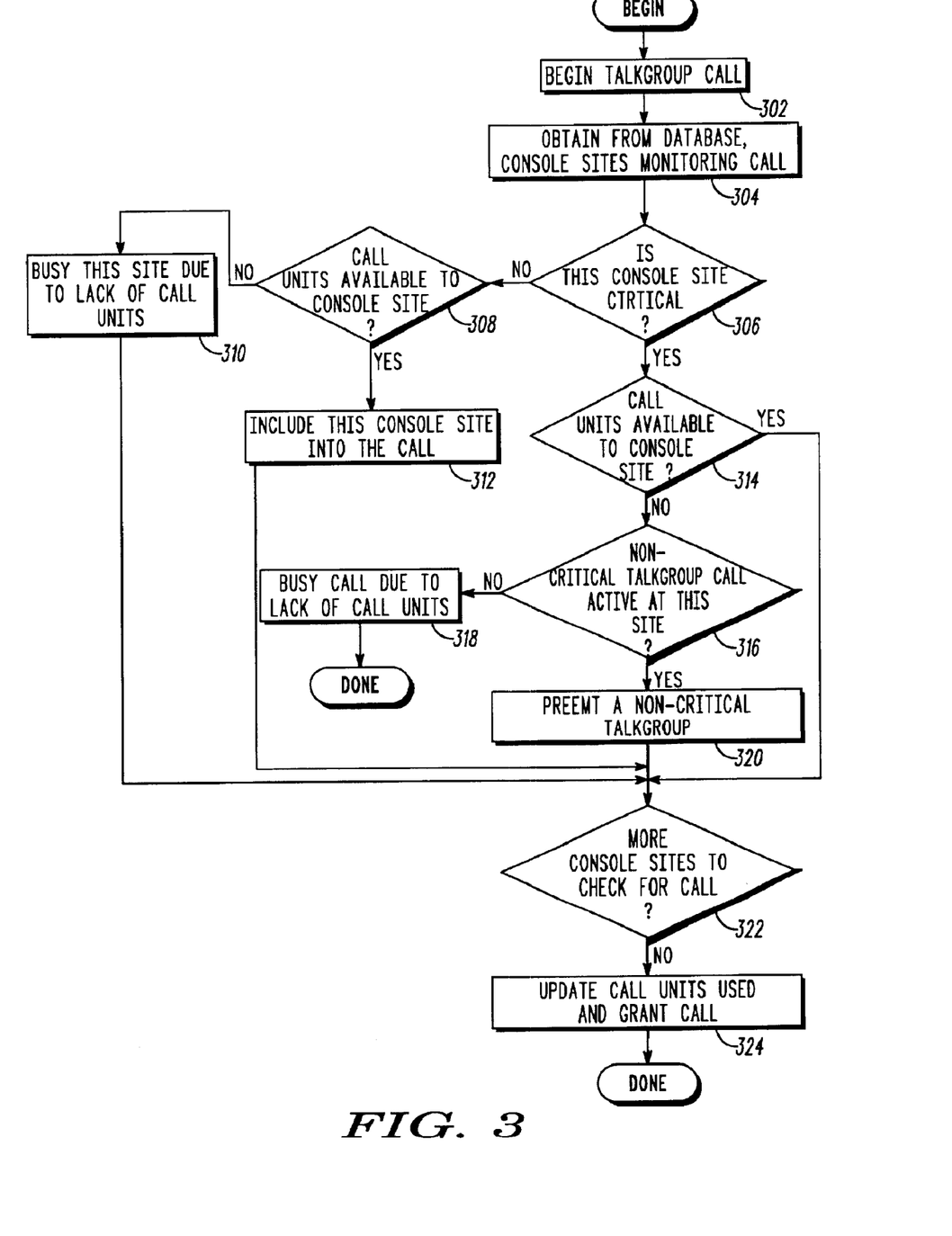
FIG. 3 is a flowchart showing a method of call control using the database of critical talkgroups according to the invention.

Now turning to FIG. 3, there will be described a method of call control according to the invention. The steps of FIG. 3 are implemented, where applicable, using stored software routines within the zone controller and/or consoles at the various sites. The method of FIG. 3 presumes that a database of critical talkgroups at the various console sites has been compiled, for example, in the manner described in relation to FIG. 2, to determine which talkgroups are critical at which sites. However, as will be appreciated, the determination of which talkgroups are critical may be determined dynamically rather than by consulting a database.

The flowchart begins at step 302, with the beginning of a talkgroup call. In one embodiment, step 302 means the receiving of a call request for a talkgroup call by the zone controller. For example, assume that the zone controller has received a call request for talkgroup 1. Alternatively, step 302 might occur when the zone controller has granted a call request for talkgroup 1 to participating repeater sites but not yet into participating console sites. At step 304, the zone controller obtains from the database, the console sites desiring to monitor/participate in the talkgroup call. For example, as indicated in Table 1, both sites 104 and 106 include consoles desiring to monitor/participate in the talkgroup 1 call. Talkgroup 1 is non-critical for site 104 and critical for site 106.

At step 306, the zone controller determines a monitoring status of one of the sites requesting participation in the call. Assume for purposes of the present example that the zone controller obtains the monitoring status ("non-critical") of talkgroup 1 associated with site 104. For those sites that are non-critical, the zone controller determines at step 308 whether call units of bandwidth are available to the non-critical console site. If bandwidth is available, the zone controller will include the non-critical console site into the call, at step 312. Thus, for example, assume that ten call units of bandwidth are available for the console site link 162 associated with site 104. The zone controller will grant site 104 into the call if it determines that the talkgroup call will require less than 10 units of bandwidth. In one embodiment, this comprises the zone controller forwarding a multicast group address to the participating consoles (e.g., console 132) at site 104. Thereafter, upon console 132 joining the multicast group address, the network creates a spanning tree of router interfaces to route payload for talkgroup 1 to console 132.

If, at step 308, the zone controller determines that there is not enough bandwidth to support a call request, the site is busied at step 310. Therefore, any non-critical consoles at the site will not be included in the call, but will be added into the call when bandwidth becomes available. In one embodiment, if a console is not included in a call because it is designated as a non-priority console, the zone controller will notify the console that there is a talkgroup call active but it is not receiving payload. Thereafter, the console may elect to change its priority status so that it is more likely to receive payload for the call. For example, at site 104, assume console 132 is notified that talkgroup 1 is active but it is not receiving audio because it is designated as a non-critical console for talkgroup 1. Console 132 may change its monitoring status to "critical" for talkgroup 1 by sending an updated status message to the zone controller.

At step 322, if there are more console sites to check for a call, the process returns to step 306 to check the next console site. Thus, continuing the present example for talkgroup 1, the zone controller will return to step 306 to obtain the monitoring status ("critical") of talkgroup 1 associated with site 106. For those sites that are critical, the zone controller determines at step 314 whether call units of bandwidth are available to the critical console site. If bandwidth is available, and if there are no more sites to check (step 322), the call is granted at step 324, the zone controller forwards a multicast group address to the appropriate consoles (e.g., console 138) and updates the number of available call units accordingly, based on the number of call units that are in use by the presently granted call.

If, at step 314, the zone controller determines that there are not enough call units of bandwidth to support a call to a priority or "critical" console, the zone controller may pre-empt other active, preferably non-critical, calls at step 320 so as to make bandwidth available for the critical console. For example, suppose that active calls to site 106 have consumed all of the available bandwidth on console site link 160, thereby causing insufficient bandwidth to be available for the critical console 138 desiring to monitor talkgroup 1. The zone controller may pre-empt an active call for talkgroup 3 ("non-critical") to make available bandwidth for the critical call. Alternatively, for example on an emergency basis, the zone controller might also pre-empt other critical calls. Once bandwidth is available, and if there are no more sites to check (step 322), the call is granted at step 324, the zone controller forwards a multicast group address to the appropriate consoles and updates the number of available call units accordingly, based on the number of call units that are in use by the presently granted call.

The present disclosure has thus identified methods for establishing priority or critical talkgroups at console sites, and for establishing calls based on the designated priority levels in a manner that allows for the limited bandwidth of console site links to be allocated on a priority basis for the talkgroups identified as critical. In this manner, console operators will be more likely to receive audio for high priority or critical calls.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a communication system using a packet network for distributing packets between endpoints desiring to participate in talkgroup calls, the endpoints comprising a plurality of consoles distributed among one or more console sites and a plurality of communication units, a method comprising:

receiving a call request for a talkgroup call between the endpoints of the communication system;

identifying a number of priority consoles requesting participation in the talkgroup call wherein the priority consoles are identified based upon information relating to the requested talkgroup call;

determining, for one or more console sites links of the packet network serving the identified priority consoles, an availability of bandwidth; and granting the call request if sufficient bandwidth is available for each of the one or more determined console site links.

2. The method of claim 1, wherein the step of identifying a number of priority consoles comprises:

receiving, by a call controller from one or more consoles, a message requesting priority participation in the talkgroup call; and designating the one or more consoles as priority consoles.

3. The method of claim 1, wherein the step of identifying a number of priority consoles comprises:

receiving, by a call controller from a management device, information identifying one or more consoles as priority consoles; and based on the information, designating the one or more consoles as priority consoles.

4. The method of claim 1, wherein the step of determining an availability of bandwidth comprises determining a number of call units of bandwidth supportable by the one or more console site links.

5. The method of claim 1, further comprising:

busying the call request, yielding a busied call request if, at a time of the request, sufficient bandwidth is not available for each of the one or more console site links; and granting the busied call request at a later time if, at the later time, sufficient bandwidth becomes available for each of the one or more console site links.

6. The method claim 1, comprising:

granting the call request even if sufficient bandwidth is not available on a console site link of the one or more console site links, by pre-empting one or more active calls as needed to sufficiently increase the available bandwidth on the console site link.

7. The method of claim 6, wherein the step of pre-empting one or more active calls comprises pre-empting a number of active calls designated as non-priority calls on the console site link.

8. The method of claim 7, comprising:

receiving, by a call controller from one or more consoles, a message requesting non-priority participation in the talkgroup call; and designating the one or more consoles as non-priority consoles.

9. The method of claim 7, comprising:

determining a volume threshold for priority calls;

designating a call as a non-priority call if it is being monitored at a volume less than the volume threshold.

10. The method of claim 7, comprising:

designating a call as a non-priority call if the call is in hang-time.

11. In a communication system using a packet network for distributing packets between endpoints desiring to participate in talkgroup calls, the endpoints comprising a plurality of consoles distributed among one or more console sites and a plurality of communication units, the console sites being connected to the packet network by console site links, a method comprising:

receiving a call request for a talkgroup call between the endpoints of the communication system;

identifying a number of priority consoles requesting participation in the talkgroup call wherein the priority consoles are identified based upon information relating to the requested talkgroup call;

identifying as priority console sites, any console sites including one or more identified priority consoles for the talkgroup call;

identifying as non-priority console sites, any console sites not including one or more identified priority consoles for the talkgroup call;

determining, for a number of priority console site links associated with the priority console sites, an availability of bandwidth; and granting the call request, yielding an active talkgroup call, if sufficient bandwidth is available for each of the determined priority console site links.

12. The method of claim 11, wherein the step of determining an availability of bandwidth comprises determining numbers of call units of bandwidth supportable by the priority console site links.

13. The method of claim 11, comprising:

granting the call request even if sufficient bandwidth is not available on a priority console site link of the number of priority console site links, by pre-empting one or more active non-priority calls supported by the priority console site link to sufficiently increase the available bandwidth on the priority console site link.

14. The method of claim 11, wherein the step of granting the call request comprises sending payload associated with the talkgroup call to the priority console sites, if sufficient call units of bandwidth are available for the priority console site links.

15. The method of claim 11, further comprising:

determining, for a number of non-priority console site links associated with the non-priority console sites, an availability or bandwidth, and granting one or more non-priority console sites into the call, if sufficient bandwidth is available on the non-priority console site links.

16. The method of claim 15, wherein the step of determining an availability of bandwidth comprises determining numbers of call units of bandwidth supportable by the non-priority console site links.

17. The method of claim 16 wherein the step of granting one or more non-priority console sites into the call comprises:

sending payload associated with the talkgroup call to the one or more non-priority console sites, if sufficient call units of bandwidth are available for the one or more priority console site links.

18. The method of claim 17, comprising:

not sending payload associated with the talkgroup call to a non-priority console site, if sufficient call units of bandwidth are not available to the non-priority console site; and notifying a console at the non-priority console site, that it is not receiving payload associated with the talkgroup call.

19. The method of claim 18 comprising:

receiving, from the console at the non-priority console site, a message indicating a desire to change its priority status for the talkgroup call;

in response to the message, designating the console as a priority console and changing the non-priority console site to a priority console site for the talkgroup call;

pre-empting one or more non-priority calls as needed to sufficiently increase the available bandwidth on the console site link associated with the priority console; and sending payload associated with the talkgroup call to the priority console, if sufficient call units of bandwidth are available for its associated console site link.

20. The method of claim 18 comprising:

activating, by the console at the non-priority console site, a PTT switch indicating a desire to source payload for the talkgroup call;

changing a priority status of the console to a priority console for the duration of the call.

* * * * *

UNITED STATES PATENT AND TRADEMARK OFFICE
CERTIFICATE OF CORRECTION

PATENT NO. : 6,920,114 B2
DATED : July 19, 2005
INVENTOR(S) : McDonald et al.

It is certified that error appears in the above-identified patent and that said Letters Patent is hereby corrected as shown below:

<u>Column 9,</u>
Line 10, change "sites" to -- site --.
Line 41, change "The method" to -- The method of --.

<u>Column 10,</u>
Line 43, change "or" to -- of --.

Signed and Sealed this

Sixteenth Day of May, 2006

JON W. DUDAS
*Director of the United States Patent and Trademark Office*